J. LONG.
Plow.
No. 91,354.
Patented June 15, 1869.
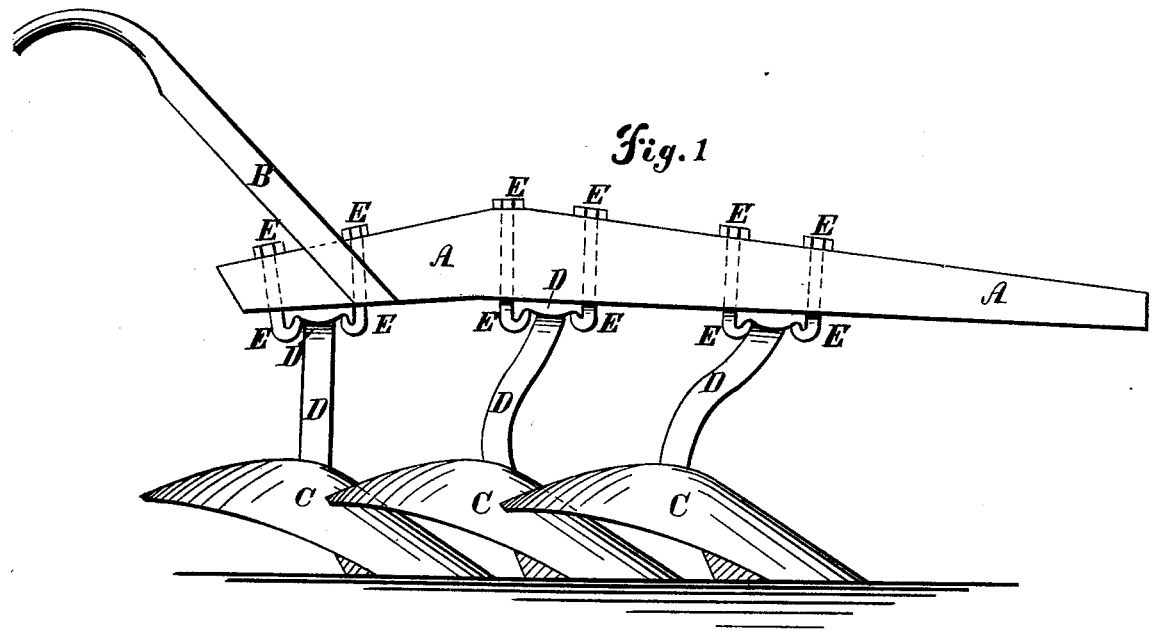
WITNESSES:
A. Bennakendorf
Thos A. Morgan
INVENTOR:
J. Long
per Mmm &
attys.

JOSIAH LONG, OF LEAVENWORTH, INDIANA.

Letters Patent No. 91,354, dated June 15, 1869.

IMPROVEMENT IN PLOWS.

The Schedule referred to in these Letters Patent and making part of the same.

*To all whom it may concern:*

Be it known that I, JOSIAH LONG, of Leavenworth, Crawford county, Indiana, have invented a new and improved Plow; and I do hereby declare that the following is a full, clear, and exact description thereof, which will enable others skilled in the art to make and use the same, reference being had to the accompanying drawing, forming part of this specification.

The figure is a side view of my improved plow.

My invention has for its object to furnish an improved plow, which shall be so constructed as to more thoroughly turn and pulverize the soil than plows constructed in the ordinary manner, while at the same time they may be adjusted to turn a narrow or wide furrow, according to the character of the soil to be plowed; and It consists in the manner in which the plow-standards are attached to the beam, as hereinafter more fully described.

A is the plow-beam, and B are the handles of the plow, about the construction of which there is nothing new.

C are the plows, the mould-boards of which are made narrow, so that each plow may turn a very narrow furrow, while the width of the two or three furrows may be no wider, or but little wider than the furrow of an ordinary plow.

The standards D of the plows are bent, or curved more or less, and their upper ends are made flat, and horizontal, to fit upon the under side of the beam A, and at right angles to said beam.

The under sides of the upper or horizontal parts of the standards D are grooved along their edges, as shown in the figure, to receive the hooks of the hook-bolts E, which pass up through holes in the beam A, where they are secured in place, clamping the standards D against the under side of the beam A, by nuts screwed upon their upper ends, as shown in the figure.

The upper part of the standard D, of the forward plow, is turned to the left, and the standards of the rear plows are turned to the right.

When three plows are used, the standard of the rear plow is made with a longer curve than the standard of the plow in front of it, so that the plows will not be in line with each other.

By this construction and arrangement of the plows, the soil will be cut up, turned over, and pulverized more thoroughly than it can be when the furrow is cut and turned by a single plow.

I claim as new, and desire to secure by Letters Patent—

The plow-standards D, constructed, arranged, and secured to the plow-beam A, substantially in the manner herein shown and described, and for the purpose set forth.

JOSIAH LONG.

Witnesses:
JOHN S. WHITTEN,
RICHD. B. McCURAIG.